Feb. 6, 1968   S. M. DE CORSO ET AL   3,368,018
ELECTRODE AND ELECTRODE TIP FOR USE THEREIN
Filed March 17, 1965   2 Sheets-Sheet 1

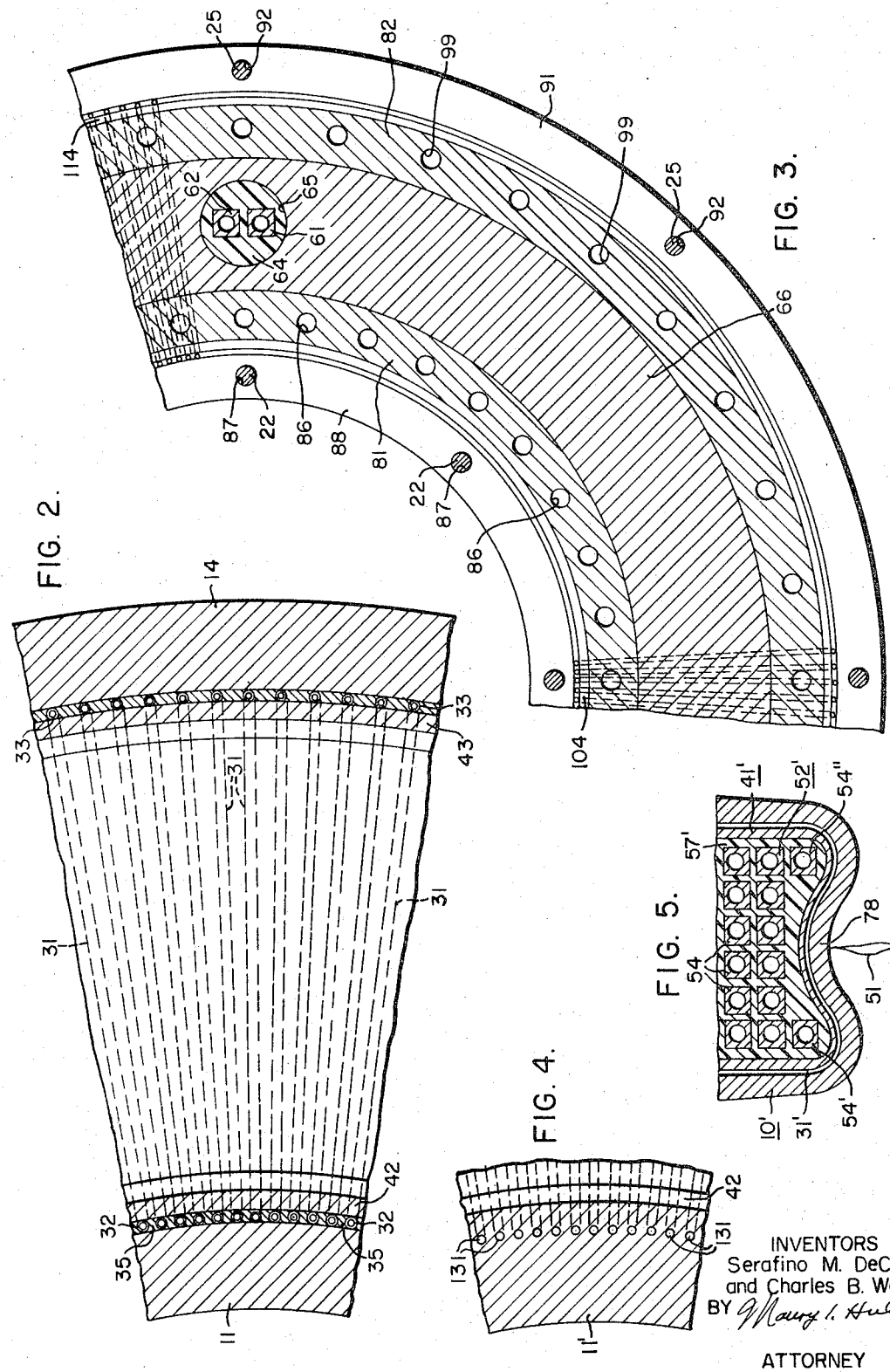

United States Patent Office 3,368,018
Patented Feb. 6, 1968

3,368,018
ELECTRODE AND ELECTRODE TIP
FOR USE THEREIN
Serafino M. De Corso, Wilkins Township, Pittsburgh, and
Charles B. Wolf, North Huntington Township, Irwin,
Pa., assignors to Westinghouse Electric Corporation,
Pittsburgh, Pa., a corporation of Pennsylvania
Filed Mar. 17, 1965, Ser. No. 440,425
13 Claims. (Cl. 13—18)

This invention relates to improvements in fluid cooled electrodes for electric arc furnaces, and more particularly to an improved fluid cooled electrode and electrode tip structure to provide a substantially non-consumable arcing surface.

Although it has been known for many years that the only practical way to prevent sublimation of material from the arcing surface of an electrode as a result of the intensely hot arc spot, with ultimate burn-through and destruction of the electrode, was to employ fluid cooling to conduct heat away from the arcing surface, nevertheless, prior art solutions to the problem of providing a structure which would have sufficient fluid flow capacity to remove the necessary heat flux, while providing sufficient current carrying capacity for the arc current, and at the same time making provision for mounting a magnetic field producing coil near the arcing surface to set up a field of sufficient magnitude to continually move the arc, have usually resulted from compromises between the three requirements, with the result that the capacity and useful life of the electrode was limited in one way or another. Furthermore, in prior art electrodes a burn-through has heretofore usually resulted in the escape of such a large quantity of cooling fluid that the electrode was in substance destroyed and had to be replaced.

We overcome many of the disadvantages and limitations of the prior art by our improved electrode tip construction. In a copending application of Serafino M. De Corso and Charles B. Wolf for "Non-Consumable Arc Electrode," filed Oct. 29, 1964, Ser. No. 407,327, and assigned to the assignee of the instant invention, there is described and claimed a generally cylindrical shaped electrode having at the arcing end thereof an annular water cooled electrode face member with a magnetic field coil located in the electrode face member and near the arcing surface. The electrode and electrode face member, or electrode tip, of the present invention, constitute an improvement upon the structure of the aforementioned copending application.

In summary, our electrode tip or electrode face member is composed of a highly heat conductive material such as copper and contains a multitude of integral water passages. One way of manufacturing the tip is with two annular cups one disposed inside the other. Each cup has inner and outer wall portions which resemble two short cylinders of different diameters concentrically disposed with respect to each other. In each cup, a bottom portion closes the lower end of the annular area between the two cylindrical wall portions. At closely spaced intervals around the entire outer surface of the inner annular cup and the entire inner surface of the outside or larger annular cup are disposed generally U-shaped passageways, or tubes snugly fitting between the inner walls of the outside annular cup and the outside walls of the inside annular cup. The tubes are made of a highly heat conductive material, and the spaces between the tubes are filled with spacers of the same material, for example copper. The whole assembly is then joined into a single unit by means of a brazing mat which fills all the remaining space. Disposed within the smaller or inside annular cup is the coil for setting up a magnetic field at the arcing surface. The multitudinous tubes form passageways for the flow of a cooling fluid, such as water, near the arcing surface and provide other advantages; for example, should a burn-through occur, the amount of water lost through any one of these small tubes would be insufficient to cause shut down and to destroy the electrode, or cause disastrous explosions.

Accordingly, a primary object of our invention is to provide a new and improved electrode tip structure for an arcing surface.

Another object is to provide a new and improved fluid cooled electrode tip structure.

A further object is to provide a new and improved fluid cooled electrode tip structure having a multitude of small fluid passageways to limit the fluid lost as a result of a burn-through at any particular passageway.

Still another object is to provide an electrode tip with integral passages in which the stresses due to water pressure are not transmitted to the tip walls; therefore the tip wall thickness may be much less than a tip with an annular cooling passage which is continuous.

Still a further object is to provide a new and improved electrode.

These and other objects will become more clearly apparent after a study of the following specification, when read in connection with the accompanying drawings, in which:

FIGURE 2 is a sectional view in a plane passing through the line II—II of FIGURE 1;

FIGURE 3 is the sectional view in a plane passing through the line III—III of FIGURE 1;

FIG. 4 is a fragmentary cross-sectional view of our tip, in the plane corresponding to that of FIG. 2, according to a second embodiment of our invention; and FIG. 5 is a fragmentary view of a tip according to an additional embodiment of our invention.

Figure 1:
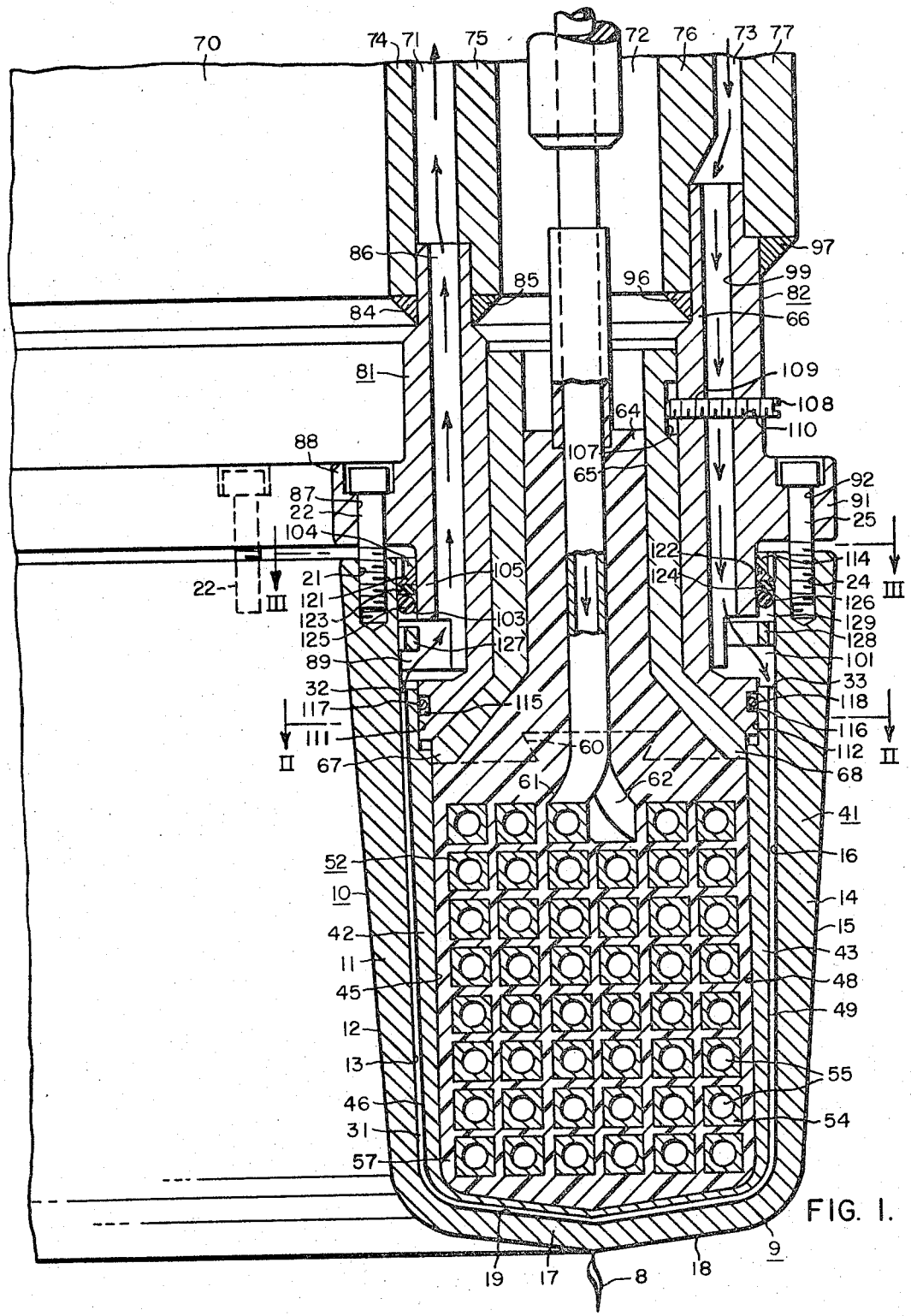
FIGURE 1 is a view partly in elevation and partly in section of a tip according to the preferred embodiment of our invention.

Referring now to the drawings in which like reference numerals are used throughout to designate like parts for a more detailed understanding of the invention, and in particular to FIGURE 1 thereof, the electrode tip generally designated 9 is seen to be generally in the shape of an annular or ring-like cup. In actuality, one way of constructing the tip according to one embodiment of our invention is to use two annular cups, one inside the other, with a plurality of U-shaped tubes at spaced intervals located between adjacent walls of the inner and outer annular cups, all being joined together into a single unit. Outer annular cup 10 has two generally cylindrical concentric wall portions 11 and 14, inner cylindrical wall portion 11 of smaller diameter having an outer surface 12 and an inner surface 13, outer cylindrical wall portion 14 of larger diameter having an outer surface 15 and an inner surface 16 with the bottom portion of the aforementioned annular cup member 10 being provided with tapering bottom 17 with an outer surface 18 and an inner surface 19.

In the upper end or upper edge of cylindrical wall portion 11 there are disposed at spaced intervals around the periphery a plurality of bores for receiving retaining bolts, one of these bores being shown at 21 for bolt 22. At the upper end of the outer cylindrical wall portion 14 there are also disposed at spaced intervals around the top a plurality of bores, one of these bores being shown at 24 for retaining bolt 25.

A plurality of generally U-shaped tubes composed of copper or other highly heat conductive material are disposed around the entire periphery of the annular tip at spaced intervals, one of these tubes 31 being shown in FIGURE 1, other of the tubes being shown in FIGURE 2. The ends of the tubes are designated 32 and 33, FIGS. 1 and 2. The spaces between tubes are filled with a highly heat conductive metal or filling, which is preferably poured into the space between the tubes in a liquid state and allowed to harden forming a firm bond with the remainder of the structure. This filling is designated 35 in FIGURE 2.

Inside of the U formed by the tubes there is disposed an inner annular cup member generally designated 43, consisting of two substantially concentric cylindrical wall portions 42 and 43 of different diameters and which are substantially parallel to each other. Inner wall portion 42 of smaller diameter has outer surface 46 and inner surface 45; outer wall portion 43 of larger diameter has outer surface 49 and inner surface 48. It is seen that the outer surface 46 of inner wall portion 42, and the outer surface 49 of outer cylindrical wall portion 43 fit immediately adjacent the aforementioned tubes 31.

Inside the inner annular cup member 41 there is disposed a coil generally designated 52 for setting up a magnetic field at the arcing surface of the tip to cause the arc to move substantially continuously in an annular path. Coil 52 consists of a number of turns of hollow copper conduit, the turns being designated 54 and having internal passageways 55 therein for the flow of a cooling fluid. The entire coil 52 is mounted in an annular housing 57 composed of an electrically insulating material such as a mica tape or molded mica insulation further molded in an epoxy resin, and it is seen that each turn of the coil is electrically insulated from every other turn of the coil, the insulation between turns being shown at 58 and consisting of, for example, thin glass cloth. Two lead-ins to the coil consisting also of hollow conduit composed of highly heat conductive and electrically conductive material are shown at 61 and 62, these leads 61 and 62 passing through a sleeve or a bushing 64 composed of insulating material disposed in a bore 65 in back ring member 66 of steel or other suitable material, FIG. 3, are thence extending to the outer end of the electrode where they are connected to fluid inlet means for bringing a fluid under considerable pressure to the coil and conducting fluid from the coil after it is circulated through the turns. Coil 52 may be operatively attached to members 64 and 66 by the use of recess slot 60. The coil may be made in separate sections which are electrically in series but are hydraulically in parallel to increase the water flow through the coil and increase the amount of heat flux which can be conducted away from the coil, and to increase the operating voltage of coil.

As previously stated, the electrode in general comprises a plurality of concentric elongated tubular members spaced from each other to form, in addition to the central opening 70, cylindrical passageways 71, 72 and 73, there being an inner tubular member 74 providing central opening 70, a further tubular member 75 of somewhat larger diameter than that of tubular member 74 and spaced therefrom to form a water outlet passageway 71, still a further tubular member 76 of greater diameter than that of tubular member 75 and spaced therefrom to form cylindrical space 72 through which the aforementioned leads to the coil 52 pass, and external to the tubular member 76 is still another tubular member 77 of greater diameter than that of the tubular member 76 and spaced therefrom to form cylindrical water inlet passageway 73.

Two substantially concentric metallic ring supporting members of different diameters couple the aforementioned tip structure comprising the two annular cups to the aforementioned electrode stem, shank or body structure comprising the tubular members 74, 75, 76 and 77. One of these coupling or supporting rings is shown at 81, member 81 being the inner coupling member of smaller diameter, and the other annular ring like coupling member is generally designated 82. The upper end of member 81 is seen to extend into the cylindrical passageway 71 formed between tubes 74 and 75, FIG. 1, and to be welded to tubes 74 and 75 at welds 84 and 85. It will be understood that the welds 84 and 85 are annular, and extend all the way around the inside and the outside of the member 81. Member 81 has a plurality of spaced passageways 86 therethrough, these passageways conducting cooling fluid from an annular fluid header 89, into which fluid flows after it comes out of the ends 32 of tubes 31, to the cylindrical-shaped fluid outlet passageway 71 formed between tubular members 74 and 75. The spaced passageways 86 are also shown in FIGURE 3, to which particular attention is directed.

The outer coupling or supporting member 82 is seen, FIG. 1, to have the upper end thereof including the inner and outer wall portions welded to tubular members 76 and 77 at annular welds 96 and 97 respectively, and supporting ring member 82 is seen to have spaced passageways 99 therethrough, FIGS. 1 and 3, for bringing a cooling fluid from the cylindrical inlet passageway 73 to the annular fluid header 101.

The aforementioned supporting ring member 81 is seen to have an inwardly extending annular flange portion 88 having a plurality of spaced bores 87 therethrough, through which pass the aforementioned coupling bolts, one of these bolts being shown at 22.

The aforementioned outer coupling or supporting ring member 82 is seen to have an outwardly extending annular flange portion 91 in which there are a plurality of spaced bores 92 for receiving the bolts 25.

The heads of bolts 22 and 25 are seen to be recessed in bore portions of increased diameter. The aforementioned outer flange portion 91 is seen, in FIG. 1, to extend around the entire periphery of the electrode, and the aforementioned inner flange portion 88 is seen to extend around the entire inner periphery of the electrode.

The aforementioned coil housing 57 for coil 52 is securely maintained in place firmly abutting against the end of the inner annular cup member 41 by the aforementioned annular body member 66 having tapering bottom wall portions 67 and 68; the aforementioned member 66 may have a continuous groove 107 around the outside wall thereof, for receiving the ends of set screws or locking screws 108 passing through bores 109 in the walls of the aforementioned supporting ring member 82. Bore 109 may pass between passageways 99, FIG. 3. It is to be noted, FIG. 1, that the inner annular cup member generally designated 41 has at the upper end thereof two grooves 111 and 112 in surfaces 45 and 48 respectively, and it is also to be noted that the lower portions of the inner and outer annular walls of ring member 66 have annular grooves 115 and 116 therein in which are disposed O-rings 117 and 118 respectively.

It is to be observed that the lower outer wall of the extended portion 105 of the member 81 is spaced from the inner surface 13 of the annular cup member 10 by annular space 103. The inwardly flaring annular lip 104 with the slanting or tapering bottom wall portion is formed of electrically conductive material, and is secured to or formed integrally with outer annular cup member 10. In the space 103 adjacent lip 104 there is disposed a contact ring 121 which is generally triangular in cross-section, having a tapering upper surface which snugly fits the tapering lower surface of lip 104, and a smooth surface which snugly fits the wall of extended portion 105. Adjacent the contact ring 121 there is a back up ring 123, and further the space 103 contains an O-ring 125 adjacent and beneath back up ring 123. It is seen that the pressure of water in the fluid header 89, which may be 100 p.s.i., exerts an upward force on O-ring 125 and back up ring 123, which forces contact ring 121 upward. Because of the tapering upper surface of contact ring 121, ring 121 is forced into firm engagement with both the wall of extended portion 105 and the lip 104. Electric current for arc 8 flows down tubes 74 and 75, through member 81, extended portion 105, ring 121, lip 104, and thence through outer annular cup member 10 to the arcing surface.

The arrangement of the inner surface 16 of the outer cylindrical wall portion 14 of the outer annular cup member 10 is somewhat similar; annular lip 114 is integral with wall portion 14; space 129 has therein a contact ring 122 triangular in cross-section, a back up ring 124, and an O-ring 126, FIG. 1. Pressure in fluid header 101, which may be 500 p.s.i., forces back up ring 124 upward with great force, forcing contact ring 122 into very firm contact with lip 114 and the wall of extended portion 106. The electrical contact is sufficiently good that the two rings 121 and 122 will conduct 50 to 80 thousand amperes without overheating.

The contact ring arrangement just described constitutes no part of the present invention.

It is noted that the greater fluid pressure, 500 p.s.i., is in outside header 101. This is especially desirable when alternating current is used to supply the arc. At 60 cycles per second, the "skin effect" is sufficiently great so that the major portion of the current tends to flow down the outside of the electrode and the outside of the tip.

The use of large water pressures, such as 500 p.s.i., is desirable for other reasons. The boiling point of water is a function of the pressure, and as will be readily understood by those skilled in the art, boiling in the tubes or passageways is very dangerous because fluid is no longer available to conduct heat flux away from the walls of the tubes.

Furthermore, high fluid pressure in the fluid inlet header 101 increases fluid velocity in the tubes and reduces temperature rise of the cooling fluid. Water in inlet header 101 may be 125° F., and water in exit fluid header 89 may be 200° F., leaving a wide safety margin under 212° F., the boiling point of water (at one atmosphere of pressure).

In constructing the electrode tip of our invention, it may be convenient to initially extend the inner and outer wall portions 42 and 43 of inner annular cup member 41 to the very tops of inner and outer wall portions 11 and 14 of outer annular cup member 10, with tubes 31 also extending this far up. Thereafter the tip is machined to provide some of the cut-away portions or annular grooves shown in FIGURE 1, for example grooves 111 and 112, and fluid headers 89 and 101, and the slanting surfaces of lips 104 and 114.

In FIG. 4, to which particular attention is directed, a second embodiment of the invention is shown, in which tubes 31 are replaced by corresponding passageways 131 formed in an annular cup 11' in which inner and outer annular cups are integrally formed with each other. For example, three or four drilling operations would complete a passageway, with unused drilled portions through the walls being filled and bonded.

While the material of annular cup members 10 and 41 should have good thermal and electrical conductivity, and also good heat dissipation properties, i.e. high specific heat, high thermal conductivity and high density, it should also be non-magnetic so as not to provide a diverting path for the magnetic flux of coil 52.

Particular reference is made now to FIG. 5, where a fragmentary sectional view of a tip according to another embodiment of the invention is shown. The bottom surface of the tip has an annular concave or grooved portion 78. Coil 52' has turns 54' and 54" extending further down in the tip than the remainder of the coil, tending to produce a magnetic field which confines arc 51 to the shallow groove. Outer annular cup member 10' and inner annular cup member 41' are curved as shown, as is coil housing 57'.

There has been provided then apparatus well suited to accomplish the aforedescribed objects of the invention.

Certain departures from the strict dimensions and features of the structures of FIGS. 1, 2 and 3 may be desirable in certain applications. For example, the inner ring of bolts 22 extending through flange 88 may be omitted to provide for expansion of the cylinders or other material at their different rates.

Whereas an annular shape is convenient for our electrode tip, our invention is not limited thereto. The tip may have an exterior surface which is square, with a square central opening, may contain a space for a circular coil, and have the U-shaped tubes or passageways at spaced intervals around the path which the arc would follow on the arcing surface. The coil may be elliptical and the tip elliptical in shape, so long as the fluid passageways cross the path of the arc, near the arcing surface.

Furthermore, our invention includes tubes or other passageways other than those extending radially or directly across the tip; the tubes may be skewed. The tubes or other passageways may be square in cross section, or any other desired shape.

The structure may be strengthened by providing ribs or struts, not shown for convenience of illustration, connecting adjoining tubes of the group of tubes 74, 75, 76 and 77. Furthermore, a honeycomb structure for pairs of tubes may be employed, if desired. Additional strength and ease of construction can be obtained by the use of extruded tubes possibly of aluminum at 74, 75, 76 and 77.

It will be seen that the tip is regular in shape, whereas, if desired, the inner wall portion and the bottom wall portion of the tip might have spaced similar irregularities around the periphery thereof if desired.

It should also be pointed out that the hollow bore or central passageway 70 permits material introduction and also fuse material injection into the furnace.

The construction of the tip and its rugged connection to the supporting electrode body of concentric cylinders permits the use of high pressure water or other cooling fluid, increasing the rate of flow and increasing the heat flux which may be removed by the water. Furthermore, the apparatus is admirably suited for high fluid velocity. The use of high pressure water in inlet 73 between tubes 76 and 77 provides a number of advantages; it provides maximum pressure on the conduction ring at the outer periphery where most current will flow due to the skin effect; it provides maximum cooling capability at the outer periphery where it is most needed; it provides best balance on differential thermal expansion of the two pairs of aluminum tubes, because heated water would be flowing up inside the pair 74 and 75, but furnace heat flux will tend to heat up the outside pair 76 and 77, the net effects being offsetting. Lastly, the tendency to cavitate due to low pressure at the tube outlet is reduced.

Another advantage in this tip is that the conduction ring may be made loose fitting to allow eccentric movement adjustment during assembly.

The inside aluminum tube structure can flex relative to outside, providing for a good mating to tip eccentricities.

Means for detecting lack of fast arc rotation may be mounted within or on the electrode, since ample space is provided.

The invention includes the use of coatings of various material on the tip where desired.

The current conduction takes place through the contact rings rather than the electrode rim clamp, another advantage.

The contact rings 121 and 122 may be silver plated and together with lips 104 and 114 and other current conducting joints may also be silver plated. The exterior electrode clamping surfaces may be metal plated if desired.

If desired, a nozzle shape may be provided for the entry and exit holes in the tip.

The discrete water flow passages within the tip provided by the aforementioned tubes make for uniformity of the flow adjacent all regions of the arcing surface, and furthermore, should a burn-through occur to one of the small tubes, so that water escapes from the tip, the size of the tube may maintain the escape water at a flow rate or value which will not require shut down of the furnace and replacement at the tip.

If desired, a butt conductor joint may be provided between the tip and the electrode. A gap between the tip and the electrode may be provided for cutting bolts by sawing.

Lastly, the apparatus permits the use of composite structure or shells in the tip.

Whereas we have shown and described our invention with respect to some embodiments thereof which give satisfactory results, it should be understood that changes may be made and equivalents substituted without departing from the spirit and scope of the invention.

We claim as our invention:

1. An electrode tip comprising an outer annular cup member composed of a non-magnetic material having good electrical and thermal conductivity and providing an arcing surface, an inner annular cup member composed of a material having similar thermal, electrical, and magnetic characteristics, said inner annular cup member being disposed within the outer annular cup member, the inner annular cup member having outer dimensions chosen in accordance with the inner dimensions of the outer annular cup member to provide a space between adjacent wall surfaces, and a plurality of generally U-shaped tubes disposed within the space between the outer annular cup member and the inner annular cup member, said plurality of tubes being disposed at closely spaced intervals around the entire periphery of the inner annular cup member, the entire tip structure being joined into a single unit, said tubes being adapted to conduct a cooling fluid near the arcing surface of the electrode tip.

2. An electrode tip according to claim 1 including in addition filler material disposed in the spaces between the tubes.

3. An electrode tip according to claim 1 including in addition means forming a fluid inlet header communicating with corresponding ends of all of said tubes, and means forming a fluid outlet header communicating with all the other ends of said tubes.

4. In an electrode having an elongated body portion comprising at least two concentric tubes of graduated diameters spaced from each other to form a fluid inlet passageway, a fluid outlet passageway, and a passageway for electrical leads, an electrode tip structure comprising a generally annular cup shaped member composed of a non-magnetic, highly heat conductive material, the annular cup shaped member including an inner generally cylindrical wall portion and a concentric outer generally cylindrical wall portion, means forming a plurality of generally U-shaped passageways extending axially through the outer wall portion, across the bottom of the annular cup member and axially through the inner wall portion, fluid passageway forming means communicating between the fluid inlet passageway and all of the corresponding ends of the U-shaped passageways in the annular cup shaped member, and other fluid passageway forming means communicating with all the other ends of the U-shaped passageways in the annular cup shaped member and with the fluid outlet passageway.

5. Electrode tip apparatus comprising a generally annular cup member composed of a highly heat conductive material and having an inner cylindrical wall portion, an outer cylindrical wall portion, and a bottom wall portion forming an arcing surface, a plurality of generally U-shaped tubes mounted within the annular cup member extending axially along both cylindrical wall portions and across the bottom wall portion of the cup member, the tubes being mounted at spaced intervals around the entire periphery of the annular cup member, and a field coil mounted within the annular cup member for setting up a magnetic field adjacent the bottom of the annular cup member to substantially continuously move the arc in an annular path around the tip.

6. Apparatus according to claim 5 additionally characterized as being adapted to be mounted on an electrode body portion consisting of a plurality of concentric tubes of graduated diameters and forming fluid inlet and fluid outlet passageways between tubes, and including in addition passageway forming means communicating between all of the corresponding ends of the U-shaped tubes in the annular cup member and one of the fluid passageways in the body portion, and other fluid passageways forming means communicating with all of the other corresponding ends of the U-shaped tubes in the annular cup member and communicating with another cylindrical fluid passageway between two of the tubes of the electrode body portion.

7. Electrode apparatus according to claim 5 additionally characterized as having a plurality of threaded bores at spaced intervals around the top of the inner cylindrical wall portion of the annular cup member, and another plurality of threaded bores at spaced intervals around the top of the outer cylindrical wall portion of the annular cup member, the first named plurality of bores and the last named plurality of bores being adapted to receive bolts for retaining the tip to the body portion of the electrode.

8. In an electrode, in combination, an outer annular cup member composed of a non-magnetic material having good electrical and thermal conductivity and providing an electrode tip and arcing surface, an inner annular cup member composed of a material having similar thermal, electrical, and magnetic characteristics, said inner annular cup member being disposed within the outer annular cup member, the inner annular cup member having outer dimensions chosen in accordance with the inner dimensions of the outer annular cup member to provide a space between adjacent wall surfaces, a plurality of generally U-shaped tubes disposed within the space between the outer annular cup member and the inner annular cup member, said plurality of tubes being disposed at closely spaced intervals around the entire periphery of the inner annular cup member, the entire tip structure being joined into a single unit, said tubes being adapted to conduct a cooling fluid near the arcing surface of the electrode tip, and an electrode body portion supporting the inner and outer annular cup members, the electrode body portion having fluid inlet and fluid outlet passageways therein communicating with said tubes.

9. An electrode according to claim 8 including in addition filter material disposed in the spaces between the tubes.

10. An electrode according to claim 8 including in addition means forming a fluid inlet header communicating with corresponding ends of all of said tubes, and means forming a fluid outlet header communicating with all the other ends of said tubes, the fluid inlet header and fluid outlet header communicating with the inlet and outlet passageways of the electrode body portion.

11. In electrode apparatus, in combination, an annular cup member composed of a highly heat conductive material and having an inner cylindrical wall portion, an outer cylindrical wall portion, and a bottom wall portion forming an arcing surface, a plurality of generally U-shaped passageways within the annular cup member extending axially along both cylindrical wall portions and across the bottom wall portion of the cup member, the passageways being at spaced intervals around the entire periphery of the annular cup member, and a field coil mounted in the annular cup member for setting up a magnetic field adajacent the bottom of the annular cup member to substantially continuously move the arc in an annular path around the tip.

12. Apparatus according to claim 11 including in addition an electrode body portion consisting of a plurality of concentric tubes of electrically conductive material of graduated diameters and forming fluid inlet and fluid outlet passageways between tubes, and including in addition passageway forming means communicating between all of the corresponding ends of the U-shaped tubes in the annular cup member and one of the fluid passageways in the body portion, and other fluid passageways forming means communicating with all of the other corresponding ends of the U-shaped tubes in the annular cup member and communicating with another cylindrical fluid passageway between two of the tubes of the electrode body portion.

13. Electrode apparatus according to claim 11 additionally characterized as having an electrode body portion, a plurality of threaded bores at spaced intervals around the top of the inner cylindrical wall portion of the annular cup member, and another plurality of threaded bores at spaced intervals around the top of the outer cylindrical wall portion of the annular cup member, and a plurality of bolts in the first named plurality of bores and in the last named plurality of bores for retaining the tip to the body portion of the electrode.

References Cited

UNITED STATES PATENTS

| | | | |
|---|---|---|---|
| 2,052,796 | 9/1936 | Rava | 219—75 |
| 2,472,851 | 6/1949 | Landis et al. | 219—123 |
| 3,130,292 | 4/1964 | Gage et al. | 219—75 |
| 3,194,941 | 7/1965 | Baird | 219—121 |

BERNARD A. GILHEANY, *Primary Examiner.*

H. B. GILSON, *Assistant Examiner.*